United States Patent [19]

Chraplyvy et al.

[11] Patent Number: 5,559,920
[45] Date of Patent: Sep. 24, 1996

[54] DISPERSION COMPENSATION IN OPTICAL FIBER COMMUNICATIONS

[75] Inventors: Andrew R. Chraplyvy, Matawan; Fabrizio Forghieri, Princeton Junction; Alan H. Gnauck, Middletown; Robert W. Tkach, Little Silver, all of N.J.

[73] Assignee: Lucent Technologies Inc., Murray Hill, N.J.

[21] Appl. No.: 396,841

[22] Filed: Mar. 1, 1995

[51] Int. Cl.⁶ ............................................. G02B 6/02
[52] U.S. Cl. .............................. 385/123; 359/115
[58] Field of Search ........................ 359/115, 124, 359/127, 160, 161, 173, 179, 341, 344, 188; 385/27, 31, 122, 100, 123, 50, 24; 372/6, 21; 319/160, 161, 173, 179, 182, 326, 338, 341

[56] References Cited

U.S. PATENT DOCUMENTS

| | | | |
|---|---|---|---|
| 5,035,481 | 7/1991 | Mollenauer | 385/24 X |
| 5,224,183 | 6/1993 | Dugan | 385/27 X |
| 5,280,383 | 1/1994 | Federici et al. | 359/341 |
| 5,327,516 | 5/1993 | Walker et al. | 385/123 |
| 5,400,165 | 3/1995 | Gnauck et al. | 319/161 |

OTHER PUBLICATIONS

A. M. Vengsarkar and W. A. Reed, "Dispersion–compensating single–mode fibers: efficient designs for first– and second–order compensation", *Optics Letters*, vol. 18, No. 11, pp. 924–926 (1993).

A. H. Gnauck, A. R. Chraplyvy, R. W. Tkach and R. M. Derosier, "160 Gbit/s (8×20Gbit/s WDM) 300 km transmission with 50 km amplifier spacing and span–by–span dispersion reversal", *Elec. Lett.* vol. 30, No. 15, pp. 1241, 1242 (1994).

*Primary Examiner*—Akm E. Ullah
*Attorney, Agent, or Firm*—George S. Indig

[57] ABSTRACT

Critical placement and lengths of dispersion-compensating fiber maximize capacity in upgraded in-ground optical fiber communication systems. Higher per-channel bit rates in single-channel systems and in WDM systems are permitted.

9 Claims, 3 Drawing Sheets

DISPERSION COMPENSATION IN OPTICAL FIBER COMMUNICATIONS

TECHNICAL FIELD

Optical fiber communication systems incorporating compensating fiber for reducing chromatic dispersion.

DESCRIPTION OF PRIOR ART

State-of-the-art optical fiber communication systems have profited from advances in fiber as well as in system design.

Dispersion-shifted fiber (DSF), in properly balancing effects of material dispersion and waveguide dispersion, have nulled chromatic dispersion and minimized bit rate-limiting effects due to that cause for operation at a system wavelength of 1550 nm. This permitted operation within the preferred low-loss region of the prevalent silica-based fiber. Bit rates of 2.5 Gb/sec and higher over fiber spans of up to 120 km are prescribed in new systems. More generally, DSF is useful when system operation is limited by dispersion, i.e.:

$$\text{bitrate}^2 \times \text{dispersion} \times \text{fiber length} \geq 104{,}000 \text{ (gbit/sec)}^2 \text{ ps/nm} \quad \text{Eq. 1}$$

Wavelength Division Multiplexing (WDM) was expected to permit simultaneous operation of multiple channels, each operating at the same per-channel bit rates. Prospects for WDM became realistic with the advent of the erbium-doped fiber amplifier (EDFA) with its ability to simultaneously amplify all channels of the WDM set.

At first thwarted by the non-linear effect of 4-wave mixing (4WM), the fiber of U.S. Pat. No. 5,327,516, issued Jul. 5, 1994, permitted attainment of the expected advantages of WDM without impairing single-channel capacity.

Dispersion-compensating fiber (DCF) offers an alternative or supplement to the patented fiber for 1550 nm operation for dispersion-limited systems. Use of lengths of DCF in series with conventional single mode transmission fiber, of dispersion sign opposite to that of the transmission fiber, eliminates capacity-limiting effects of chromatic dispersion. It is common practice to "equalize" dispersion by DCF-compensation by returning the signal dispersion to zero and causing contraction of the dispersion-broadened pulse to its as-launched length.

DCF design has advanced. A fiber of high negative dispersion at 1550 nm, −68 ps/nm-km—permits compensation of prevalent positive-dispersion transmission fiber with short lengths of compensating fiber. See, *Optics Letters*, vol. 18, no. 11, pp. 924–926 (1993). Valuable for future systems, it will have particular impact for upgrading of in-ground systems. Conventional fiber has a positive dispersion of 17 ps/nm-km, so that coils of DCF of ¼ the length of the transmission fiber are sufficient for compensation. Upgrading plans to WDM use are advanced by negative dispersion slope, which due to the positive slope of the transmission fiber, more uniformly compensates over the wavelength spectrum of the WDM channel set.

Concatenation is a form a dispersion compensation. Rather than using short length—generally compact spools—of DCF, for compensating the dispersion of the transmission fiber, it uses successive lengths of transmission fiber of alternating sign of dispersion. With the recognition of the significance of 4WM in precluding use of DSF for many WDM systems, renewed attention has been paid to concatenation. See, *Elec. Lett.*, vol. 30, pp. 1241, 1242 (1994).

SUMMARY OF THE INVENTION

Proper dispersion management takes non-linear effects, as well as chromatic dispersion, into account and increases per-channel bit rates for single channel as well as WDM operation. The invention uses dispersion averaging, in which the dispersion is permitted to cross zero—ideally, to make equal excursions into both positive and negative dispersion regimes. Averaging over the transmission line is accomplished by use of an initial length of fiber, nominally of dispersion half that of a succeeding amplified fiber span. As with traditional compensation systems, the final length of fiber returns the signal dispersion to zero for detection.

The invention is useful both for DCF-compensation and for concatenated systems. While discussed in terms of digital systems operating at an nominal system wavelength of 1550 nm, it is useful for analog and for other system wavelengths.

TERMINOLOGY

Dispersion—Without a modifier, refers to chromatic dispersion, a linear effect by which different spectral components have different velocities—dependent on material and fiber design. In view of preferred operation in the 1500 nm window of silica fiber, the term refers to operation at a wavelength in that regime.

Dispersion Compensation—By which successive lengths of fiber of alternating sign of dispersion maintain the magnitude of dispersion within bounds. The terminology is used to describe both use of dispersion-compensating fiber and concatenation.

Non-linear Dispersion—Pulse distortion due to interaction of dispersion and non-linear effects such as self-phase modulation (SPM).

DCF—Dispersion compensating fiber. Fiber of opposite sign of dispersion from that of the transmission fiber, generally of greater magnitude than that of the transmission fiber to enable compensation with relatively short lengths. For purposes of this description, DCF is of dispersion magnitude at least 2× that of the transmission fiber.

Back-to-Zero or Dispersion Equalization—The traditional chromatic dispersion strategy by which dispersion of one sign—generally of positive sign—is compensated by fiber of opposite sign of dispersion and of sufficient length so as to cancel the dispersion (so as to return the value of signal dispersion to zero).

Dispersion Averaging—The inventive strategy by which dispersion introduced by an amplified fiber span is accommodated by a succeeding amplified span of fiber of opposite sign of dispersion and of sufficient length to drive the dispersion to opposite sign—nominally to a magnitude of the same absolute value as introduced.

Fiber Span—The length of fiber between optical amplifiers. The terminology is used to describe DCF spans as well as spans of transmission fiber.

Terminal Span—Refers to either the initial fiber span (following the transmitter or a regenerative repeater) or the final fiber span preceding a detector (associated with a receiver or a regenerative repeater).

Intermediate Span—Any fiber span other than a terminal span.

DETAILED DESCRIPTION

Figure 1:
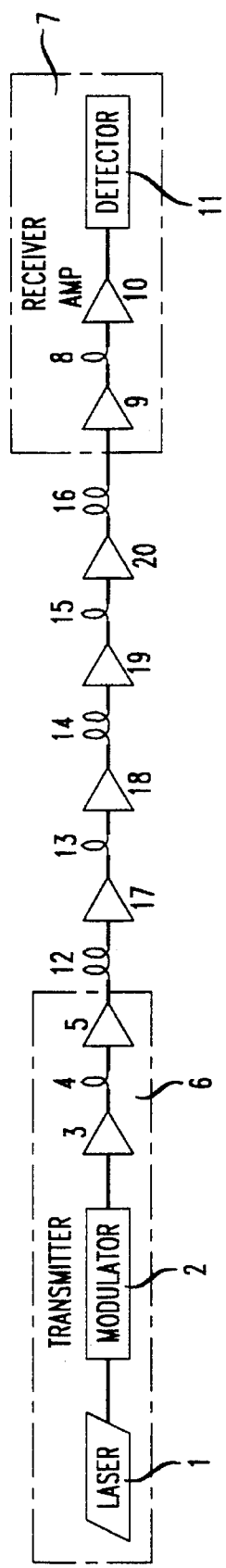
FIG. 1 is a schematic circuit diagram for a dispersion-compensated optical fiber communication system of the invention.

General—Systems are designed to accommodate the finding that non-linear operation in successive amplified spans (of fiber of opposite signs of dispersion) produces operation-significant pulse distortion under conditions that successive spans are operating in a non-linear regime. This additional "non-linear" distortion, unlike familiar linear (chromatic) distortion cannot be perfectly compensated by usual techniques. The degree of distortion in the received signal is found to be dependent on peak amplitude values of signal distortion as passed from one amplified span to the next. The finding is accommodated by use of an initial span of sufficient length to attain some peak value. In ideal systems, this value establishes a maximum dispersion which—is not exceeded but is nominally attained by—intermediate fiber spans, so that, since applied to the dispersionless launched signal, this initial span nominally introduces a degree of dispersion half of that introduced by intermediate spans.

The inventive teaching will be usefully applied to upgrading of installed systems. Plans for upgrading terrestrial systems typically consider 80 km compensated spans. A common fiber has a positive dispersion of 17 ps/nm-km, so that compensation is accomplished by 20 km of DCF of negative dispersion of 68 ps/nm-km. It is convenient to discuss the invention in terms of such an 80–20 system.

System—The invention is of no immediate consequence for systems in which operation-consequential pulse distortion is entirely due to linear dispersion. It is consequential for system use in which members of a successive pair of spans both operate in the non-linear regime. Contemplated operating conditions include terminal fibers which may be linear, and in which intermediate spans operate non-linearly.

The threshold between linear and non-linear operation is dependent on launch power density. This in turn depends on fiber characteristics together with customer specifications for span lengths and bit rate. Silica-based fiber characteristically shows a loss in the range of 0.2–1.0 dB/km. Less than order-of-magnitude change will have little effect on the conclusions reached in the following discussion, all of which are based on state-of-the-art silica fiber.

The characteristic curve for non-linear penalty shows a pronounced upturn at a "threshold" value of power. This threshold value is inversely proportional to effective core area. Both experimental and simulated information presented are based on 20 Gb/sec transmission. Core areas were 20 $\mu m^2$ for the DCF and 80 $\mu m^2$ for the transmission fiber.

The threshold value for this DCF is about 0 dBm (1 mW). The corresponding value for the 4× increased core of the transmission fiber is 4 mW. A normalized threshold value, required for "non-linear" operation is 0.05 mw/$\mu m^2$:

The threshold power requirement is generally met for contemplated systems in which length of positive dispersion transmission fiber in between amplifiers is 30 km–40 km for per-channel bit rate of 20 Gbit, or 60 km–80 km for 10 Gbit operation. This power level is inherently attained for compensating fiber, whether DCF or concatenating, for contemplated bit rates. (Bit rates above the presently-used 2.5 Gbit/sec., in requiting greater power, increase the severity of the requirement.) Systems in planning provide for amplified lengths of up to about 120 km. Until fiber loss is substantially reduced so that greater amplified lengths become feasible, DCF-compensated systems will benefit from the inventive teaching only so long as the transmission fiber to be compensated is of positive sign of dispersion. Here, the length of negative DCF required for compensation is of sufficiently-reduced core size to result in non-linear operation. (DCF of positive dispersion, of contemplated coil lengths, will likely not operate non-linearly.)

Restated, the operating requirement, for purposes of the invention, is satisfied for any system including two successive amplified fiber spans in non-linear operation. In the near term, likely DCF-compensated systems as well as concatenated systems will include a span of positive dispersion fiber of at least about 30 km–40 km for 20 Gbit operation or equivalent for other bit rates. The complete system will now include an initial span of fiber for introducing dispersion of the maximum amplitude specified, and also a terminal span for returning to zero dispersion. State-of-the-art transmitters and receivers permit systems including a larger number of intermediate spans.

A hypothetical system, both meeting the operating requirement for maximum dispersion and providing for maximum span length, is made up of intermediate spans of uniform dispersion together with terminal "half-spans" of half that dispersion. These terminal spans account for dispersionless launched and received signals. Terrain and distribution requirements will likely result in some non-uniformity. Imprecision and drifting characteristics may lead to an average total residual dispersion of small finite value. Advantages of averaging over equalization are considered realized so long as this value is no greater than ¼ of the nominal excursion.

FIG. 1 shows a generalized single-channel dispersion-averaged compensated system. It includes laser 1, modulator 2, amplifier 3, initial fiber span 4 and amplifier 5. For DCF-compensated systems, certainly for upgrading installed systems, DCF is in coil form. Here, span 4 together with amplifiers 3 and 5 will be included within transmitter 6 shown in phantom. For concatenated systems, span 4, now a half-span of transmission fiber, will be bounded by transmitter-contained amplifier 3 and external amplifier 5. Receiver 7, shown in phantom for DCF-compensation, includes the final half-span 8 between amplifiers 9 and 10. Detector 11 is intended to represent an optical-to-electrical converter together with any required ancillary equipment. Five intermediate fiber spans 12, 13, 14, 15 and 16 together with amplifiers 17, 18, 19 and 20 complete the transmission line.

For DCF-compensation, fiber spans 12, 14 and 16 are of positive dispersion transmission fiber, and spans 13 and 15 are of DCF—likely in compact spools. In principle, a DCF-compensation system could make use of transmission fiber in terminal half-spans 4 and 8. In practice, particularly for upgrading, the system will take the form discussed. The grouping of amplifier 17-span 13-amplifier 18 will share one housing, and amplifier 19-span 15-amplifier 20 will use another. For concatenated systems, all fiber spans, 4, 12–16, and 8, are transmission fiber spans, and terminal spans 4 and 8 may be of either sign of dispersion.

Figure 2:
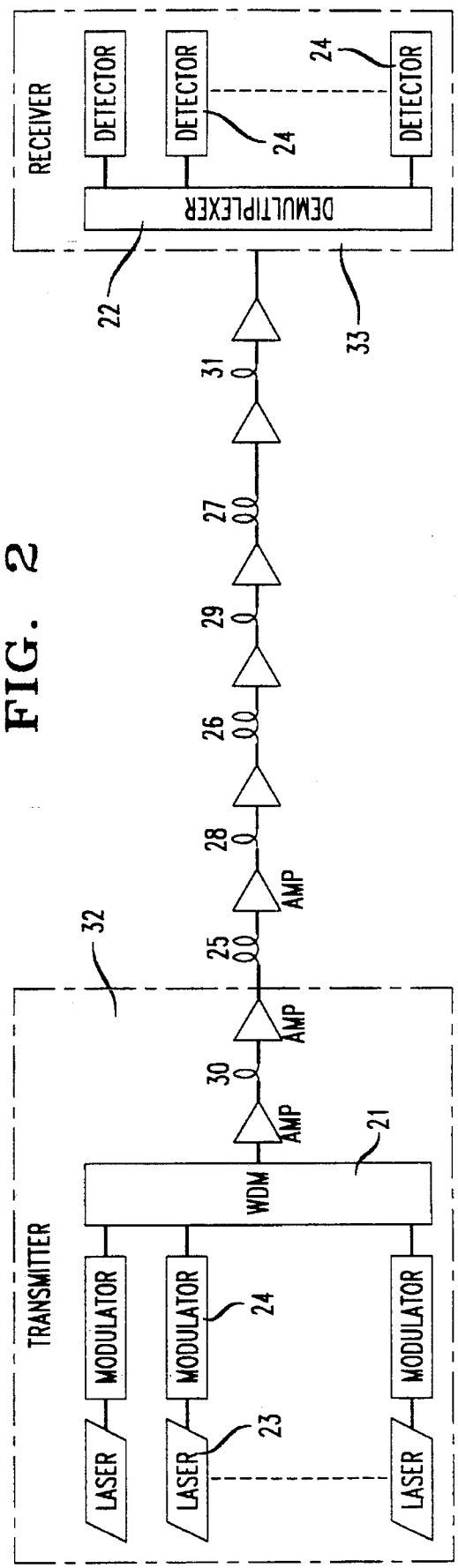
FIG. 2 is a schematic circuit diagram, similar to that of FIG. 1, but with provision for WDM.

FIG. 2 shows the analogous WDM system which now includes WDM 21 and demultiplexer 22. Provision for an 8-channel system similar to that of Example 1, includes a laser 23 and a modulator 24 for each of the channels. Individual detectors 24 receive demultiplexed channels. The remainder of the system is identical to FIG. 1. There are five full-dispersion intermediate spans 25, 26, 27 and 28, 29. Half-spans 30 and 31 together with associated amplifiers, for DCF-compensation, are housed in transmitter 32 and receiver 33.

OTHER FIGURES

Figure 3:
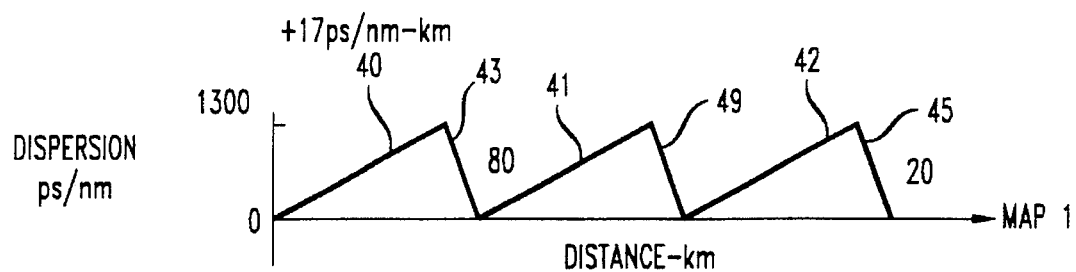
FIG. 3 is a "map" showing dispersion excursions for a traditional "back-to-zero" compensated system.
Figure 4:
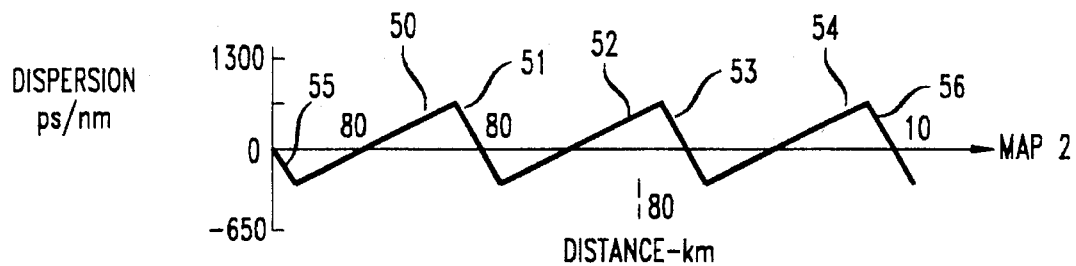
FIG. 4 is a dispersion map for systems using dispersion averaging.

FIGS. 3 and 4 are management maps for dispersion compensation. FIG. 3 shows the traditional back-to-zero plan: FIG. 4, using the same total lengths, shows the averaging plan of the invention. The figures may be considered as the DCF-compensation systems of the Examples—using transmission fiber of +17 ps/nm-km dispersion and DCF of −80 ps/nm-km.

FIG. 3 on coordinates of dispersion in ps/nm and distance in km, shows six full fiber spans: transmission spans 40, 41 and 42; and DCF spans 43, 44, 45. In this traditional back to zero map, dispersion does not change sign and shows an excursion of +1300 ps/nm.

FIG. 4 on the same coordinates maps the modified plan of the invention. Half of the full-length terminal span 45 of FIG. 3 has been removed and forms initial half-span 52, and final half-span 55. Remaining fiber spans 50–54 are unchanged and of the dispersions of spans 40–45 of FIG. 3. Peak excursions are now ±650 ps/nm.

Figure 5:
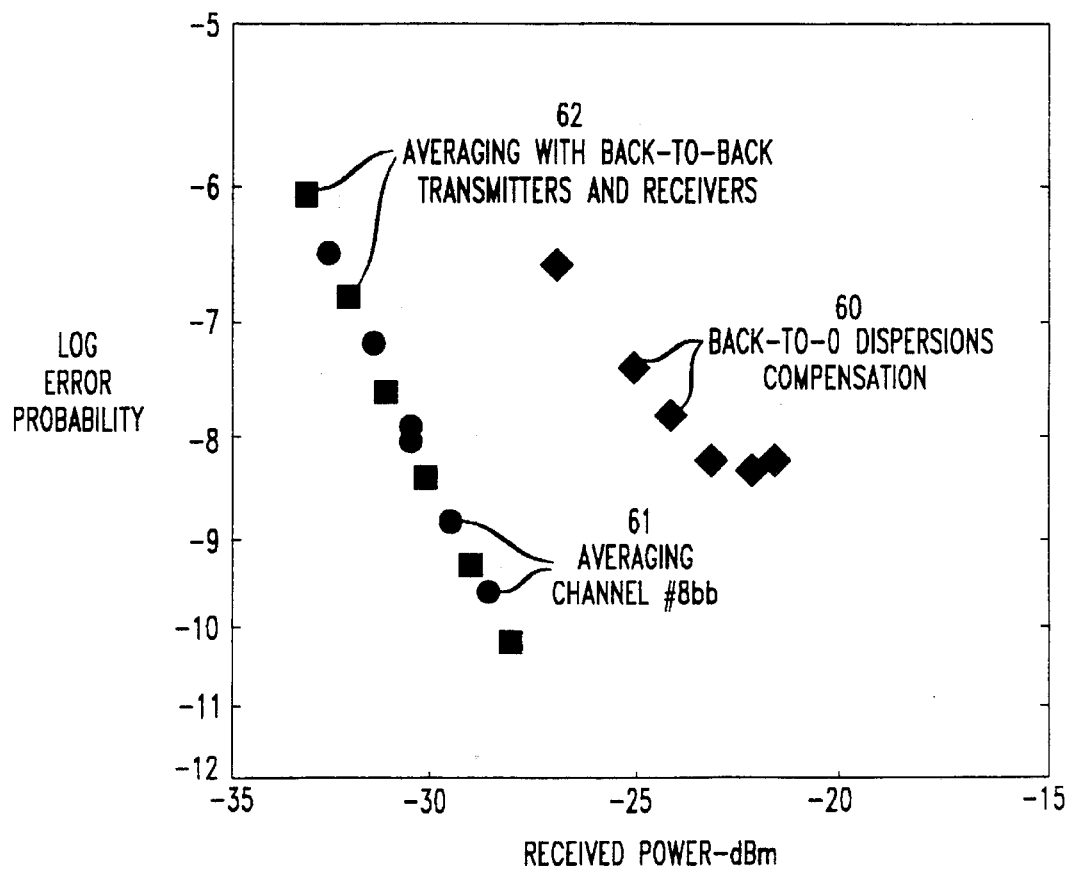
FIG. 5 is a plot of experimental data comparing bit error rates of received signal for the strategies of FIGS. 3 and 4.

FIG. 5 is a plot of bit error rate, for varying levels of received power, comparing the two strategies—curve 60 for back-to-zero and curve 61 for averaging. Data points are experimental for the 232 km system descried in the Examples. In addition, data points are presented for back-to-back transmitter and receiver on curve 62. Within measurement error, no dispersion penalty was paid by insertion of the dispersion-averaged transmission line. Curve 60 bottoms at about −23 dBm received power, showing that further amplification does not improve error rate.

Figure 6:
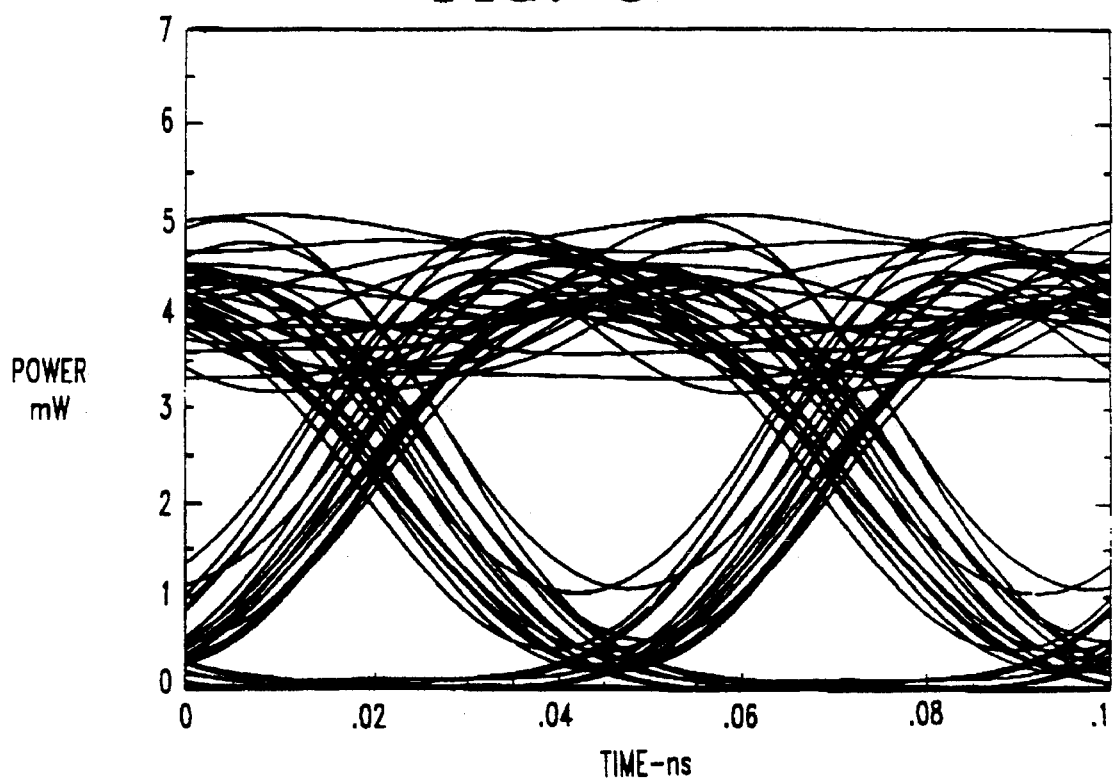
FIG. 6 is an eye diagram for a signal produced in conventional compensation systems.
Figure 7:
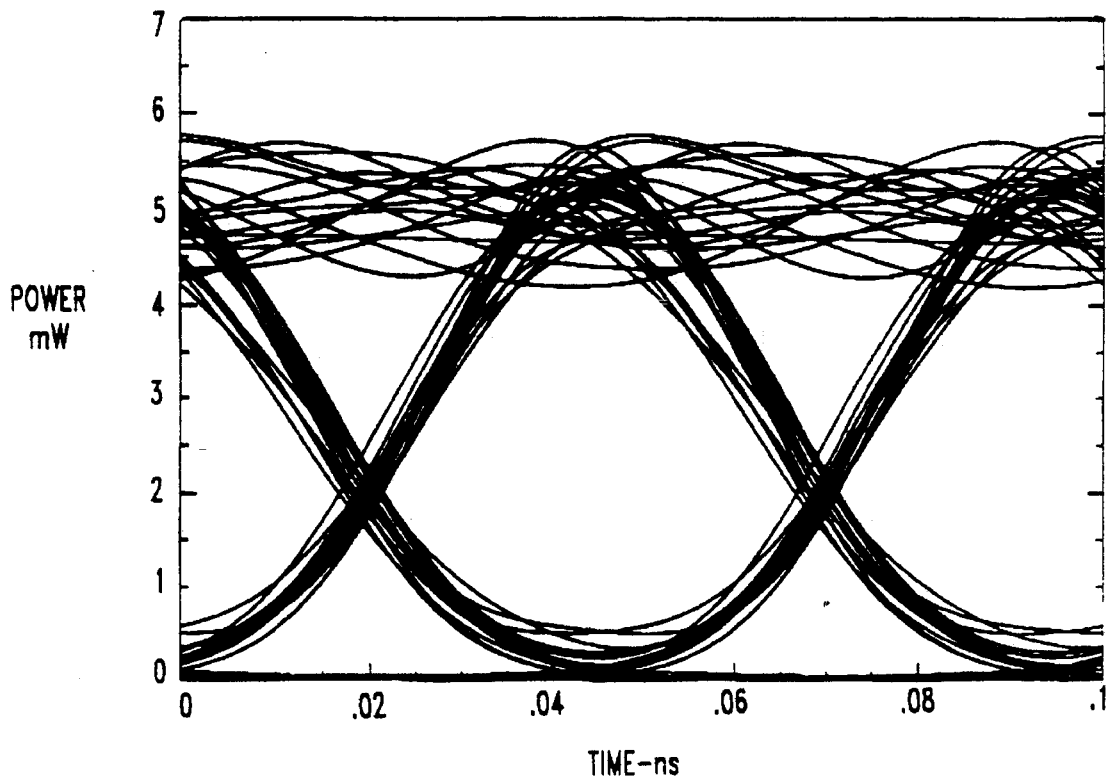
FIG. 7 is an eye diagram for received signal for a system using dispersion averaging.

FIGS. 6 and 7 are conventional eye diagrams plotted on coordinates of power in milliwatts and time in nanoseconds. FIG. 6, representing the prior art approach using the back-to-zero plan of FIG. 3 shows well in excess of the 40% eye closure, considered unacceptable. FIG. 7, for dispersion-averaging is taken from Example 1, and is reasonably representative.

EXAMPLES

The experiments reported in the examples played a role in the invention. Example 2, using the conventional dispersion management strategy of the FIG. 3 map, produced the unacceptable bit error rates of curve 60 of FIG. 5.

The failure of the first experiment ultimately led to the experiment of Example 1—differing only in following the strategy map of FIG. 4. The simple rearrangement of the same total length of DCF, placing half of the final DCF span before the transmission fiber, produced bit error rate curve 61 of FIG. 5.

Example 1

The experimental arrangement was similar to that of FIG. 2, but with additional apparatus for varying launch power and for measurement.

The transmitter consisted of eight external-cavity lasers, clustered about a system wavelength of $\lambda$=1500 nm, combined in a star coupler and modulated to yield $2^{31}-1$ pseudo-random bit stream by use of a Mach-Zehnder LiNbO$_3$ modulator. For expediency, a single modulator was used to modulate all eight channels, at a rate of 20 Gb/s. To avoid statistical pulse correspondence in adjoining channels, bits were decorrelated by passing through a 3 km length of conventional fiber (lamdba$_0$=1310 nm), providing a 1.6 bit delay between adjacent channels. Channel-to-channel spacing was 1.6 nm (200 Ghz).

The transmission system consisted of composite spans of transmission fiber with a dispersion of +17 ps/nm-km, and of DCF with a dispersion of from −50 ps/nm-km to −100 ps/nm-km. In terms of the FIG. 4 map, it included five "full" lengths 50–54 and two "half" lengths 55, 56. Transmission fiber lengths 50, 52, 54 were nominally 80 km and, accordingly, of dispersion product 80 km×+17 ps/nm-km=+1360 ps/nm. Succeeding full lengths of DCF were adjusted in length to yield a negative dispersion product of the same magnitude. Transmission fiber spans were trimmed to equalize dispersion products, so that, successive lengths departed somewhat from nominal value, and totaled 232 km. Terminal spans 55, 56 were each half that of intermediate DCF spans 51 and 53.

Multiplexed channels were modulated, were amplified to from 0 to 2 dBm/channel, were passed through the initial DCF span, and were amplified to 8 dBm/channel at the transmitter output.

The transmission line included four EDFAs providing for a power level of 2–5 dBm/channel at the input to each DCF length and for 5–7 dBm/channel at the input to each span of transmission fiber. A variable optical attenuator was included in the receiver to develop the varying received powers plotted on FIG. 5. Two multilayer interference filters in series provided a tunable bandpass of approximately 0.8 nm.

The experimental results are plotted as curve 61 on FIG. 5. FIG. 7 shows the corresponding eye diagram derived by computer simulation.

Example 2

The experimental arrangement differed from that of Example 1 in using six full length fiber spans. The two terminal half-spans of Example 1 are combined to produce the sixth full span at the input to the receiver. The same experimental conditions resulted in the data of curve 60 of FIG. 5 and the eye diagram of FIG. 6.

OTHER CONSIDERATIONS

Description has been restricted to implications of the invention. The systems of FIGS. 1 and 2 do not include a number of elements required in real operation. As an example, WDM channel separation generally depends on laser stabilization and on optical filtering.

Practical considerations may lead to other modifications. Systems have been discussed as either DCF-compensated or concatenated, and as using only two types of fiber. Under some circumstances, a hybrid system may be useful—e.g., a concatenated line may use a terminal span of DCF. Customer needs may be best satisfied by use of additional fiber types—possibly in combined terrestrial-underwater systems.

System requirements are satisfied by multi-span systems including two succeeding amplified spans of opposite sign of dispersion with both in non-linear operation. Dispersion averaging requires three or more spans, so that the two non-linear spans must be combined with at least one additional span. Beyond this number spans need not be non-linear. A complete system may include further spans which are not dispersion-averaged—which are dispersion-equalized, or even dispersion-shifted.

Initial operation of dispersion-averaged systems may not meet requirements for non-linear operation. The inventive concept may be applied to systems which operate non-linearly as upgraded, e.g. due to increased bit-rate.

Dispersion-averaging will be useful for WDM. Both numbered examples pertain to WDM operation. The DCF in those instances was of the type described in *Optics Letters*, vol. 18, no. 11, pp. 924–926 (1993). Its negative slope provided for more nearly constant compensation across the entire WDM set of subchannels. While it was not needed for the system and operations conditions of Example 1, it would be beneficial for longer systems, larger WDM bandwidth, and/or higher bit-rates.

Initial use is expected to be in upgrading of fiber of substantial dispersion, e.g. the 17 ps/nm-km of the Examples. Installed spans are of ten or more kilometers, so that residual dispersion is 170 ps/nm or more. In accordance with the invention, this excursion is halved so that residual dispersion in the compensated line ranges from +85 ps/nm to −85 ps/nm. Compensation is contemplated in new systems in which fiber spans have substantially smaller values of residual dispersion. One such example uses the fiber of U.S. Pat. No. 5,327,516, e.g. with dispersion of from 1.5 ps/nm-km to 4.0 ps/nm-km. Dispersion averaging in such a system may entail residual dispersion maxima as small as ±50 ps/nm.

We claim:

1. Optical fiber communication system for operation at a system wavelength, including a transmitter, a receiver, and a transmission line comprising successive amplified fiber spans of alternating sign of dispersion; in which the transmission line includes an initial fiber span following the transmitter, a terminal span before the receiver, and at least one intermediate span; in which length and dispersion magnitude of the terminal span is such as to compensate dispersion for a signal introduced into the receiver characterized in that the transmission line includes at least one pair of successive spans in addition to the terminal span, such that residual dispersion of the line is at least ±50 ps/nm at the commencement of the pair, and in that members of the pair are of lengths and dispersion magnitudes such that residual dispersion at their termini is at least ±50 ps/nm, whereby residual dispersion of the transmission line is compensated at the system wavelength.

2. System of claim 1 including at least three intermediate spans.

3. System of claim 2 in which fiber of alternating spans is dispersion-compensating fiber of dispersion at least twice that of intervening spans.

4. System of claim 1 in which members of the pair consist of transmission fiber.

5. System of claim 4 in which members of the pair have absolute values of dispersion of from 1.5 ps/nm-km to 4.0 ps/nm-km.

6. System of claim 1 for operation at a nominal signal wavelength of nm and at a per-channel bit-rate of at least 10 Gbit/sec.

7. System of claim 6 for operation at a per-channel bit-rate of at least 20 Gbit/sec.

8. System of claim 1 with provision for WDM operation comprising a channel multiplexer and a channel demultiplexer.

9. Communication method for operation over a dispersion-compensated silica-based multiple span optical fiber communication transmission line including the steps of modulation and amplification characterized in that the line includes successive spans of alternating sign of dispersion with residual dispersion at the end of each span of at least ±50 ps/nm, whereby residual dispersion is compensated, in which effective fiber core size and signal power introduced into each span result in a power density of at least 0.05 mw/$\mu m^2$.

* * * * *